United States Patent [19]
Chun

[11] Patent Number: 5,903,608
[45] Date of Patent: May 11, 1999

[54] ADAPTIVE BIT SWAPPING METHOD AND DEVICE FOR DISCRETE MULTITONE SYSTEM

[75] Inventor: You-sik Chun, Sungnam, Rep. of Korea

[73] Assignee: Samsung Electronics Co., Ltd., Suwon, Rep. of Korea

[21] Appl. No.: 08/899,592

[22] Filed: Jul. 24, 1997

Related U.S. Application Data

[63] Continuation of application No. 08/667,817, Jun. 20, 1996, abandoned.

[30] Foreign Application Priority Data

Jun. 30, 1995 [KR] Rep. of Korea .................. 95-19065

[51] Int. Cl.⁶ .................. H04K 1/10; H04L 27/28
[52] U.S. Cl. .................. 375/260; 375/222; 370/468
[58] Field of Search .................. 375/260, 222, 375/254; 345/506; 370/468

[56] References Cited

U.S. PATENT DOCUMENTS

| | | | |
|---|---|---|---|
| 4,679,227 | 7/1987 | Hughes-Hartugs | 379/98 |
| 5,025,469 | 6/1991 | Bingham | 379/98 |
| 5,226,081 | 7/1993 | Hinokimoto | 380/34 |
| 5,231,649 | 7/1993 | Duncanson | 375/38 |
| 5,285,474 | 2/1994 | Chow et al. | 375/13 |
| 5,295,245 | 3/1994 | Alcorn et al. | 395/164 |
| 5,317,596 | 5/1994 | Ho et al. | 375/14 |
| 5,400,322 | 3/1995 | Hunt et al. | 370/19 |
| 5,479,447 | 12/1995 | Chow et al. | 375/260 |
| 5,521,908 | 5/1996 | Younce et al. | 370/32.1 |
| 5,673,290 | 9/1997 | Cioffi | 375/260 |
| 5,696,985 | 12/1997 | Crump et al. | 395/800 |
| 5,701,444 | 12/1997 | Baldwin | 395/506 |
| 5,727,192 | 3/1998 | Baldwin | 395/522 |

OTHER PUBLICATIONS

P.S. Chow, "Bandwidth Optimized Digital Transmission Techniques For Spectrally Shaped Channels With Impulse Noise," May 1993 (A dissertation submitted to the Department of Electrical Engineering and the Committee on Graduate Studies of Stanford University in partial fulfillment of the requirements for the degree of Doctor of Philosophy) (6 pages).

*Primary Examiner*—Stephen Chin
*Assistant Examiner*—Mohammad Ghayour
*Attorney, Agent, or Firm*—Burns, Doane, Swecker & Mathis, LLP

[57] ABSTRACT

Adaptive bit swapping method and device are provided. The method includes the steps of (a) initializing the DMT system to transmit the data via the channel in a steady state; (b) selecting a frame having an inserted sync block from a frame structure of the transmitted data; (c) calculating the signal-to-noise ratios (SNRs) of respective sub-channels of the selected frame; (d) calculating first difference value between the present representative SNRs calculated in step (c) and the previous representative SNRs of each sub-channel; (e) selecting a maximum value and minimum value among the first difference values of the respective sub-channels; (f) obtaining the second difference value between the maximum value and the minimum value; (g) determining whether the second difference value is equal to or greater than the predetermined threshold value; and (h) correcting bit and power assigning tables of a transmitter and a receiver if the second difference value is greater than or equal to the threshold value. In addition, the bit and power assigning tables can be accurately corrected since bits and power are swapped using an actually measured SNR.

8 Claims, 4 Drawing Sheets

ADAPTIVE BIT SWAPPING METHOD AND DEVICE FOR DISCRETE MULTITONE SYSTEM

This application is a continuation of application Ser. No. 08/667,817, filed Jun. 20, 1996 now abandoned.

BACKGROUND OF THE INVENTION

The present invention relates to a discrete multitone (DMT) system, and more particularly, to an adaptive bit swapping method and device for a DMT system, which adjust the number of bits and power assigned to each sub-channel according to channel characteristics varied during a data transmission.

A multicarrier is generally used in a DMT system to efficiently use a channel for transmitting data. Basically in multicarrier modulation, several carrier-modulated waveforms are overlapped to represent an input bit stream. A multicarrier transmission signal is the composite of M independent sub-signals or sub-channels, each having the same bandwidth of 4.3125 KHz and the respective main frequencies of $f_i$ (i=1, 2, 3,. . .M). These sub-signals are Quadrature Amplitude Modulation (QAM) signals. When data is transmitted at a high speed via an inferior transmission path such as a copper line, the DMT system enables the data to be transmitted at 6 Mbps or above, thus offering a good service. In this DMT system using several carriers, the number of bits and power of each channel depending on its signal-to-noise ratio (SNR) are assigned to each sub-channel in the initialization of the system.

Changing the number of bits and power assigned to each sub-channel according to its SNR, which is varied without an interruption in a data stream in a data transmission mode, is referred to as bit swapping. The bit swapping is used in an Asymmetric Digital Subscriber Line (ADSL) service employing the DMT system to reduce an error probability of transmission data.

Channel characteristics gradually vary with time in most systems, and frequency response characteristics of an ADSL loop gradually vary with temperature. Therefore, a channel model determined in the initialization of a system should be changed according to the frequency response characteristics.

A conventional method for allocating bits to a sub-channel will be described as follows.

A transmitter terminal as well as a receiver terminal adaptively can operate according to the essential concept of a bit allocating method which is proposed in a dissertation submitted to the department of electrical engineering and the committee on graduate studies of STANFORD University in partial fulfillment of the requirements for the degree of doctor of philosophy, May. 1993, entitled "BANDWIDTH OPTIMIZED DIGITAL TRANSMISSION TECHNIQUES FOR SPECTRALLY SHAPED CHANNELS WITH IMPULSE NOISE", by Ronald R, Hunt and P.S. Chow. Details of the bit allocating method are as follows:

1. the steady state mean square errors(MSE)'s of all used sub-channels are monitored, where these error values are differences between inputs and outputs of a slicer;
2. it is continuously determined whether the difference between a maximum error value and a minimum error value is a predetermined threshold value (generally 3 dB) or above, and if the difference is the threshold value or above, the procedure goes to the subsequent step;
3. the bit number of a value in a bit allocation table for a sub-channel having the maximum error value is decreased by 1, while the bit number of a value in a bit allocation table for a sub-channel having the minimum error value is increased by 1;
4. the minimum error is doubled, while the maximum error is halved;
5. the slicer settings for two sub-channels whose bit values are changed are adjusted; and
6. the bit swapping information is sent back to a transmission part.

The initial number of bits allocated to a sub-channel is determined according to an SNR measured during an initialization in an ADSL DMT system. However, the above bit allocation method exhibits the drawback that a wrong bit swapping may be performed, since an MSE value may be increased due to an error such as a burst error when data is examined in a reception part, and a frequency-domain equalizer (FEQ) error can affect MSE in a steady state.

SUMMARY OF THE INVENTION

To circumvent the above problems, it is first object of the present invention to provide an adaptive bit swapping method for a DMT system in which bits allocated to each sub-channel are swapped in a transmission unit according to a actually measured SNR.

It is second object of the present invention to provide an adaptive bit swapping device for a DMT system.

To achieve the first object, there is provided an adaptive bit swapping method in a discrete multitone (DMT) system for an asymmetric digital subscriber line (ADSL) which has a transmitter for encoding and converting data to be transmitted via a channel, and a receiver for restoring the transmitted data to the original form by conversion and decoding, said method comprising the steps of: (a) initializing said DMT system to transmit said data via said channel in a steady state; (b) selecting a frame having an inserted sync block from a frame structure of said transmitted data; (c) calculating the signal-to-noise ratios (SNRs) of respective sub-channels of said selected frame; (d) calculating first difference value between the present representative SNRs calculated in step (c) and the previous representative SNRs of each sub-channel; (e) selecting a maximum value and minimum value among the first difference values of said respective sub-channels; (f) obtaining the second difference value between said maximum value and said minimum value; (g) determining whether said second difference value is equal to or greater than the predetermined threshold value; and (h) correcting bit and power assigning tables of a transmitter and a receiver if said second difference value is greater than or equal to said threshold value.

To achieve the second object, there is provided an adaptive bit swapping device functioning as a receiver for restoring the transmitted data to the original form by conversion and decoding, said device being included in a discrete multitone (DMT) system for an asymmetric digital subscriber line (ADSL) which has a transmitter for encoding and converting data to be transmitted via a channel, said device comprising: A/D converting means for converting said analogue data signal received via said channel into a digital signal; time-domain equalizing means for receiving said digital signal and reducing a guard band used to remove an interblock interference; fast-Fourier transforming means for receiving the output of said time-domain equalizing means and demodulating said data signal modulated in said transmitter; frequency-domain equalizing means for receiving the output of said fast Fourier transforming means and compensating for a phase error of each sub-channel; SNR measuring means for selecting a frame having an inserted sync block from a frame structure of said transmitted data, calculating the signal-to-noise ratios (SNRS) of respective sub-channels of said selected frame, calculating first difference value between the present representative SNRs calculated above and the previous representative SNRs of each sub-channel, selecting a maximum value and minimum value among the first difference values of said respective sub-channels, obtaining the second difference value between said maximum value and said minimum value, determining whether said second difference value is equal to or greater than the predetermined threshold value and outputting to a transmitter and a receiver the signal used for correcting bit and power assigning tables of a transmitter and a receiver; and decoding means for receiving the outputs of said SNR measuring means and said frequency-domain equalizing means, resetting a slice value, and decoding said reset slice value.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Adaptive bit swapping method and device for a DMT system according to the present invention will be described, referring to the attached drawings.

Figure 1:
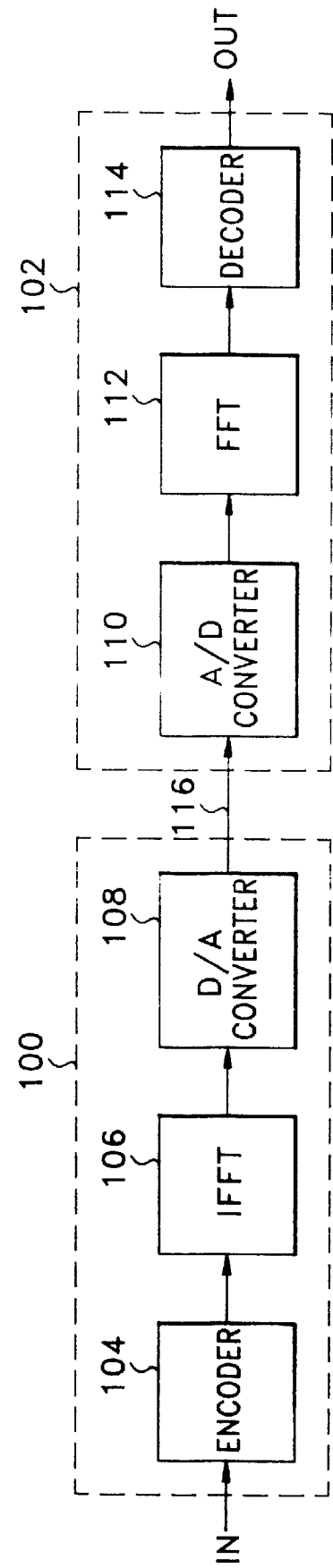
FIG. 1 is a block diagram of a conventional basic DMT system.

A conventional basic DMT system shown in FIG. 1 has a transmitter 100 including an encoder 104, an inverse fast Fourier transformer (IFFT) 106 and a digital/analogue (D/A) converter 108, a receiver 102 including an analogue/digital (A/D) converter 110, a fast Fourier transformer (FFT) 112 and a decoder 114, and a transmission path (a transmission channel or a channel) 116. A DMT system for an ADSL transmits a signal via 256 individual channels each having a 4 KHz bandwidth. The encoder 104 of the transmitter 100 in the DMT system shown in FIG. 1 simply receives data sequences via an input terminal IN (the accurate number of bits depends on a data rate and an overhead) and allocates the input data sequences to a multitude of sub-channels. The IFFT 106 produces a plurality of time based samples having several real number values from an encoded value. The D/A converter 108 converts a plurality of the received time based samples into an analogue signal suitable for transmission via a copper line, and transmits the analogue signal to the A/D converter 110 via the transmission path 116.

The receiver 102 performs the operations of the transmitter 100 in a reverse order. The receiver 102 consists of three components for performing time recovery, filtering, and channel check functions, respectively.

Figure 3:
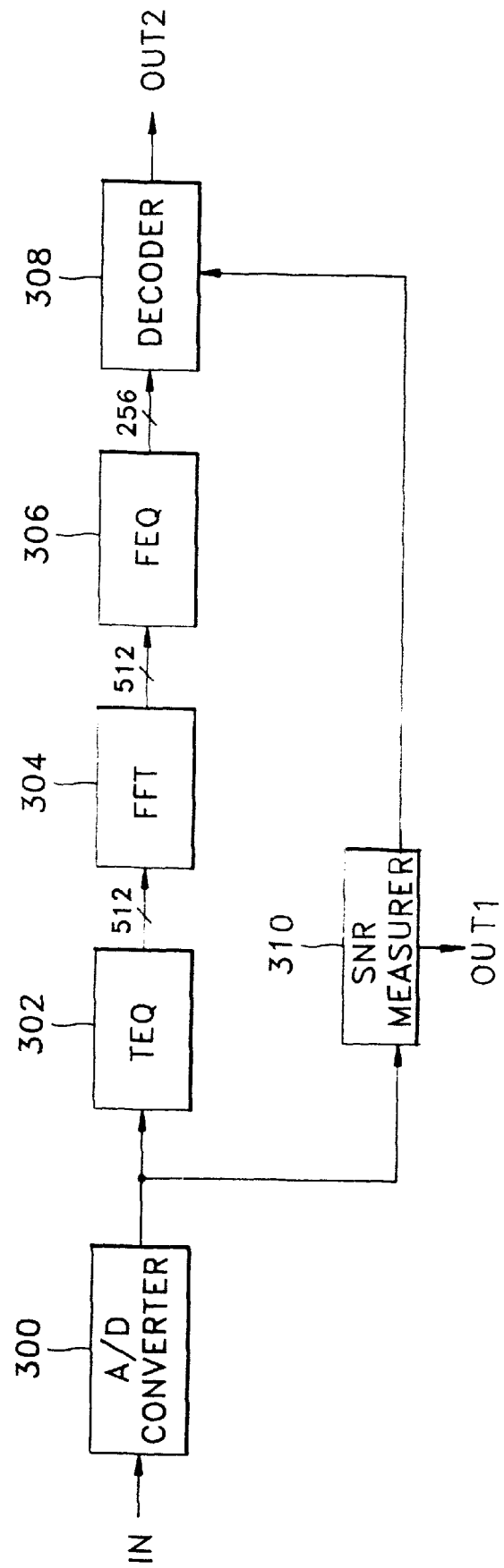
FIG. 3 is a block diagram of a receiving unit in a DMT system for performing the method of FIG. 2 according to the present invention.

An adaptive bit swapping device for a DMT system according to the present invention shown in FIG. 3 includes an A/D converter 300, a time-domain equalizer (TEQ) 302, an FFT 304, a frequency-domain equalizer (FEQ) 306, a decoder 308, and an SNR measurer 310.

Figure 2:
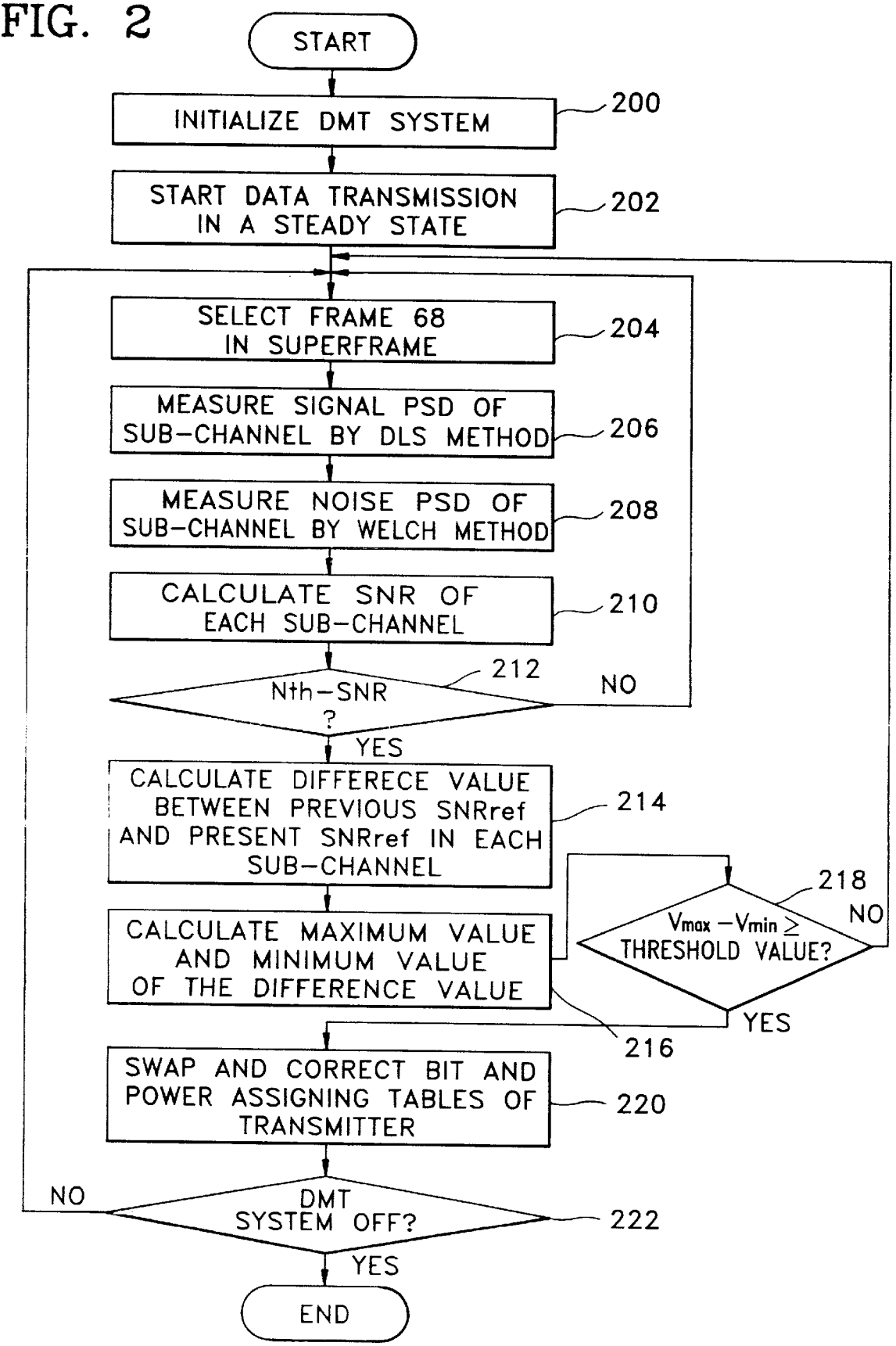
FIG. 2 is a flow-chart of a bit swapping method for a DMT system according to the present invention.

Referring to FIG. 2, showing an algorithm for a bit swapping method for a DMT system according to the present invention, when the DMT system is activated to transmit data, it is initialized considering channel conditions of the transmitter and receiver, in step 200. The initialization is divided into activation & recognition, transceiver training, and channel analysis & exchange. The initialization in the present invention is especially concerned with a channel analysis, since the SNR of each sub-channel of a channel formed between the transmitter and the receiver is measured and the number of bits and power are assigned according to the variation of the measured SNR. When the DMT system is placed in a steady state after the initialization, data transmission begins, in step 202.

Figure 4:
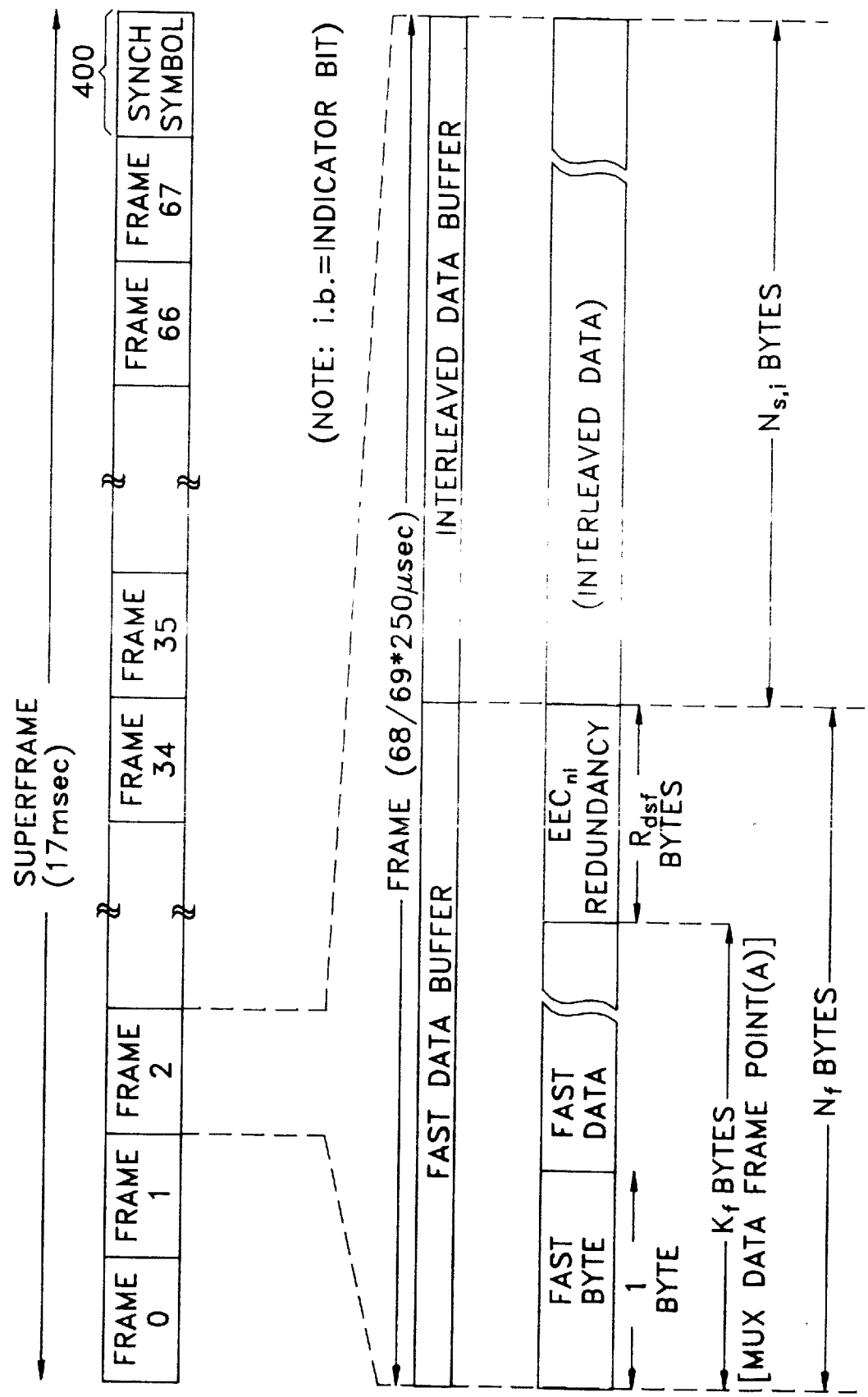
FIG. 4 illustrates the structure of a superframe based on "ADSL standards", which is transmitted in a steady state.

FIG. 4 illustrates the structure of a superframe of data transmitted in a steady state, which is determined by "ADSL standards". Referring to FIG. 4, a sync(ronization) symbol 400 used to restore the synchronization of the data without reinitialization when the data are affected by an instantaneous interrupt is inserted in a frame 68 of frames 0–68.

In step 204, only frame 68 is selected after step 202 in the present invention, while all frames among the 68 frames shown in FIG. 4 are selected to obtain MSEs in the prior art. In step 206, the signal PSD of each sub-channel is measured by a deterministic least sequence (DLS) method, after step 204. The DLS method indicates that known sequence values received from the transmitter via the channel are accumulated and averaged. A channel response free of random noise can be achieved by this method, and the signal PSD of each sub-channel can be achieved by fast Fourier transforming the channel response. In step 208, the noise PSD of each sub-channel is measured by a Welch method after step 206. After step 208, the SNR of each sub-channel is obtained from the measured signal PSD and noise PSD in step 210. After step 210, it is determined whether the obtained SNR is the Nth SNR of each sub-channel or not in step 212. Here, the N is a predetermined number(50~150). Steps 206–210 should be repeatedly performed for N sequent superframes because a plurality of sync frames 68, each pattern of which is known, are needed in order to accurately measure SNR of each sub-channel.

If N-number of SNRs for each sub-channel are obtained, first, the representative SNR($SNR_{rep}$) of each sub-channel is obtained by averaging the N-number of SNRs. Then, the difference value(or first difference value) between the presently obtained $SNR_{rep}$ and the previously obtained $SNR_{rep}$ is calculated for each sub-channel. By a method similar to that described above, all first difference values for all sub-channels are obtained in step 214.

The maximum and the minimum values among the first difference values calculated in step 214 are selected in step 216. After step 216, the second difference value between the maximum value and the minimum value is calculated and it is determined whether the second difference value is a predetermined threshold value(around 3 DB) or not in step 218. If the second difference value is smaller than the threshold value, the procedure feeds back to step 204, and if it is equal to or greater than the threshold value, the bits and power assigned to a corresponding sub-channel in a transmitter are swapped. That is, the number of bit of a sub-channel having a minimum value is assigned to sub-channel having a maximum value. Thus, the corresponding parameters (a bit number and power table) should be changed to enable a receiver to make an accurate decision, in step 220.

In step 222, it is determined whether the DMT system is off after step 220. If it is not off, the procedure feeds back to step 204, and if it is off, the bit swapping method of the present invention ends.

Since the bit swapping takes place once after at least one superframes are transmitted (17 msec required for one superframe transmission), a long time is required for the bit swapping. However, although the channel changes during the time required for the bit swapping, this method can be used because a channel changes very slowly, for example by temperature, etc.

Referring to FIG. 3 showing the device for performing the above-described method, the A/D converter 300 converts an analogue signal received via an input port IN into a digital signal. The TEQ 302 receives the digital signal from the A/D converter 300 and reduces a guard band used to remove an interblock interference (IBI) produced due to characteristics of a DMT system. For this purpose, a finite impulse response filter (FIR) may be used as the TEQ 302. The FFT 304 receives the signal output from the TEQ 302 and performs a demodulation corresponding to a modulation of the transmitter. Thus, the FFT 304 serves as a demodulator corresponding to the IFFT 106 of FIG. 1. The FEQ 306 is a filter for receiving the output of the FFT 304 and compensating for a phase error of each sub-channel. Meanwhile, the SNR measurer 310 of FIG. 3 receives the output of the A/D converter 300 and performs the steps 204–220 described in FIG. 2. The SNR measurer 310 can be achieved in terms of software in a digital signal processor. After processing step 218 shown in FIG. 2, the SNR measurer 310 outputs the control signal for bit swapping to the transmitter via an output port OUT1 to correct a bit allocation table at a transmitter and the measured SNR of each sub-channel is output to the decoder 308. The decoder 308 receives the outputs of the SNR measurer 310 when frame 68 is input and the output of the FEQ 306 when any frame among frames 0–67 is input, decides a slicer value, decodes the reset slicer value, and outputs the decoded value via an output port OUT2.

As described above, in the adaptive bit swapping method and device of the present invention in the DMT system, the method for comparing SNRs is added to an SNR measuring method used in a conventional process of initialization. The adaptive bit swapping device selects only frame 68 from each superframe, thereby simplifying a conventional complex hardware construction using all frames. Furthermore, in the adaptive bit swapping method, more accurate swapping information for changing the number of bit and corresponding power can be transmitted to a transmitter than in the conventional method depending on an MSE, since an actually measured SNR value on a frame 68 is used when the assigned bit number and the assigned quantity of power are changed according to a channel variation.

What is claimed is:

1. An adaptive bit swapping method in a discrete multitone (DMT) system for an asymmetric digital subscriber line (ADSL) which has a transmitter for encoding and converting data to be transmitted via a channel, and a receiver for restoring the transmitted data to the original form by conversion and decoding, said method comprising the steps of:

(a) initializing said DMT system to transmit said data via said channel in a steady state;

(b) selecting a frame having an inserted sync block from a frame structure of said transmitted data;

(c) calculating the signal-to-noise ratios (SNRs) of respective sub-channels of the selected frame;

(d) calculating first difference value between the present representative SNRs calculated in step (c) and the previous representative SNRs of each sub-channel;

(e) selecting a maximum value and minimum value among the first difference values of said respective sub-channels;

(f) obtaining the second difference value between said maximum value and said minimum value;

(g) determining whether said second difference value is equal to or greater than the predetermined threshold value; and (h) correcting bit and power assigning tables of a transmitter and a receiver if said second difference value is greater than or equal to said threshold value.

2. An adaptive bit swapping method as claimed in claim 1, wherein said step (a) comprises the steps of:

establishing the initial bits and power values of said DMT system; and starting a transmission of data in a steady state of said DMT system.

3. An adaptive bit swapping method as claimed in claim 1, wherein said step (c) comprises the steps of;

measuring the signal power spectrum density (PSD) of each sub-channel by a deterministic least sequence (DLS) method;

measuring a noise PSD of each sub-channel by a Welch method; and calculating the SNR of each sub-channel from said measured signal PSD and said noise PSD.

4. An adaptive bit swapping method as claimed in claim 1, wherein said steps (b) and (c) are repeatedly performed by a predetermined times, and representative SNR value of each sub-channel are calculated making use of said SNRs if a predetermined number of SNRs are obtained for each sub-channel.

5. An adaptive bit swapping method as claimed in claim 4, wherein said step (c) comprises the step of;

feeding the procedure back to said step (b), if said predetermined number of SNRs of each sub-channel are not obtained.

6. An adaptive bit swapping method as claimed in claim 1, wherein said step (g) comprises the step of;

feeding the procedure back to said step (b), if said second difference value is not greater than or equal to said predetermined threshold value.

7. An adaptive bit swapping device functioning as a receiver for restoring the transmitted data to the original form by conversion and decoding, said device being included in a discrete multitone (DMT) system for an asymmetric digital subscriber line (ADSL) which has a transmitter for encoding and converting data to be transmitted via a channel, said device comprising:

A/D converting means for converting the analogue data signal received via said channel into a digital signal;

time-domain equalizing means for receiving said digital signal and reducing a guard band used to remove an interblock interference;

fast-Fourier transforming means for receiving the output of said time-domain equalizing means and demodulating said data signal modulated in said transmitter;

frequency-domain equalizing means for receiving the output of said fast Fourier transforming means and compensating for a phase error of each sub-channel;

SNR measuring means for obtaining the representative SNRs of respective sub-channels from the output of said A/D converting means using a frame having an inserted sync symbol from a frame structure of transmitted data, calculating first difference value between the previous representative SNR and present representative SNR for each sub-channel, comparing a threshold value with second difference between maximum and minimum value of said first difference values and outputting to a transmitter and a receiver the signal used for correcting a bit allocation table according to the compared result; and decoding means for receiving the outputs of said SNR measuring means and said frequency-domain equalizing means, resetting a slice value, and decoding the reset slice value.

8. An adaptive bit swapping device functioning as a receiver for restoring the transmitted data to the original form by conversion and decoding, said device being included in a discrete multitone (DMT) system for an asymmetric digital subscriber line (ADSL) which has a transmitter for encoding and converting data to be transmitted via a channel, said device comprising:

A/D converting means for converting the analogue data signal received via said channel into a digital signal;

time-domain equalizing means for receiving said digital signal and reducing a guard band used to remove an interblock interference;

fast-Fourier transforming means for receiving the output of said time-domain equalizing means and demodulating the data signal modulated in said transmitter;

frequency-domain equalizing means for receiving the output of said fast Fourier transforming means and compensating for a phase error of each sub-channel;

SNR measuring means for selecting a frame having an inserted sync block from a frame structure of said transmitted data, calculating the signal-to-noise ratios (SNRs) of respective sub-channels of the selected frame, calculating first difference value between the present representative SNRs calculated above and the previous representative SNRs of each sub-channel, selecting a maximum value and minimum value among the first difference values of said respective sub-channels, obtaining the second difference value between said maximum value and said minimum value, determining whether said second difference value is equal to or greater than a predetermined threshold value and outputting to a transmitter and a receiver the signal used for correcting bit and power assigning tables of a transmitter and a receiver; and decoding means for receiving the outputs of said SNR measuring means and said frequency-domain equalizing means, resetting a slice value, and decoding said reset slice value.

* * * * *